Nov. 13, 1928.
W. P. SHIPMAN
1,691,501
WELDING APPARATUS
Filed April 17, 1925   5 Sheets-Sheet 1
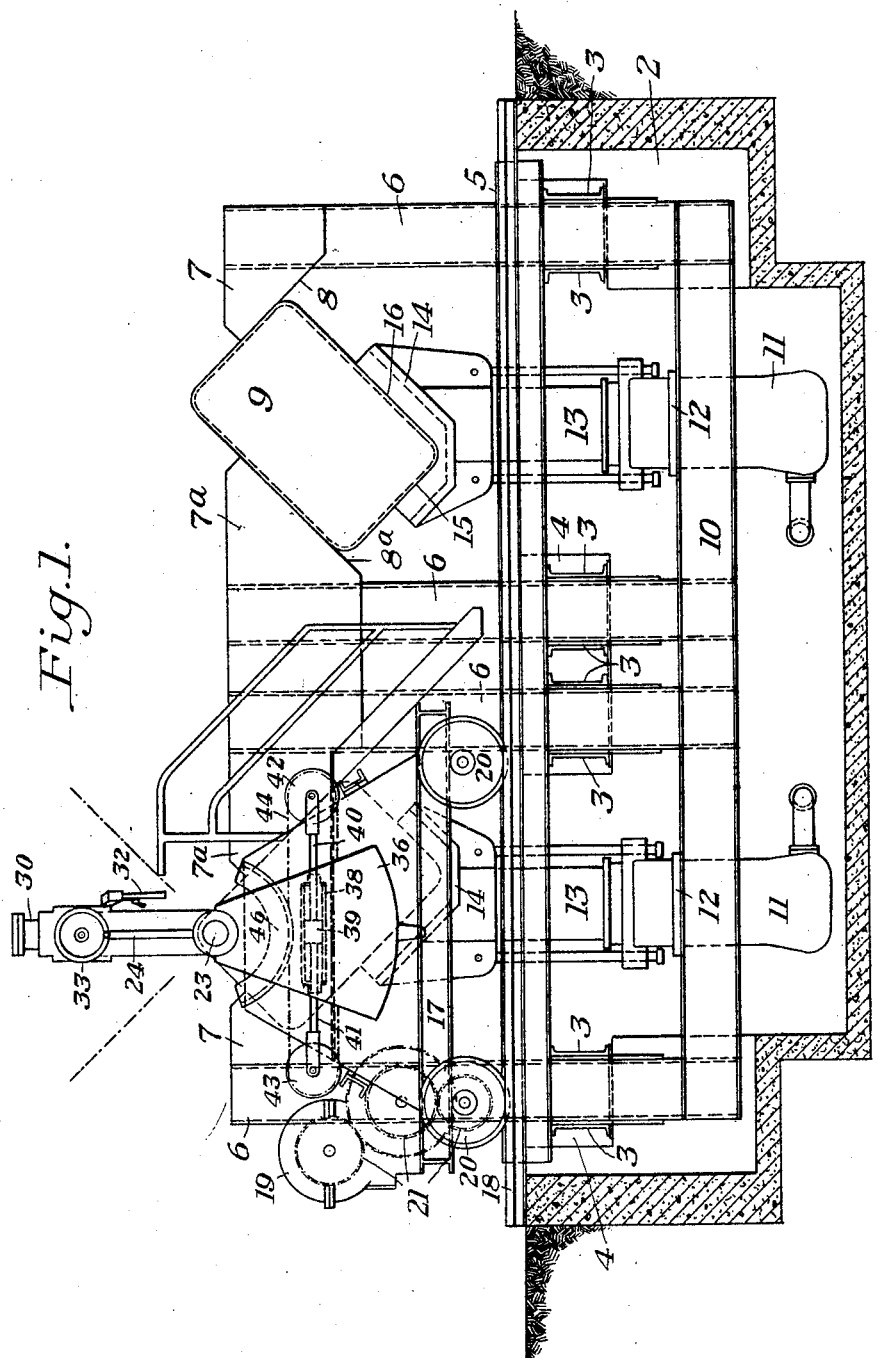
INVENTOR

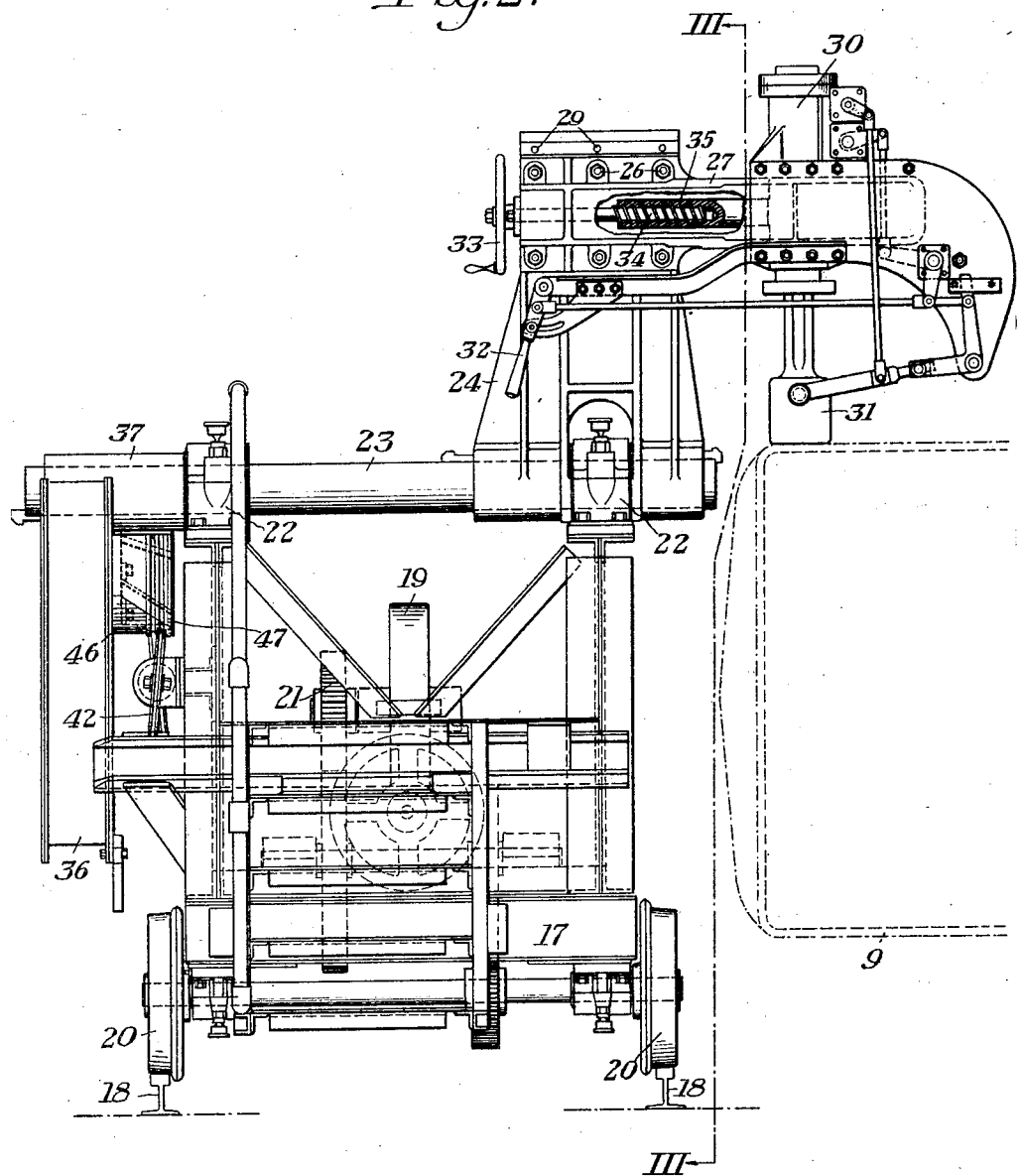

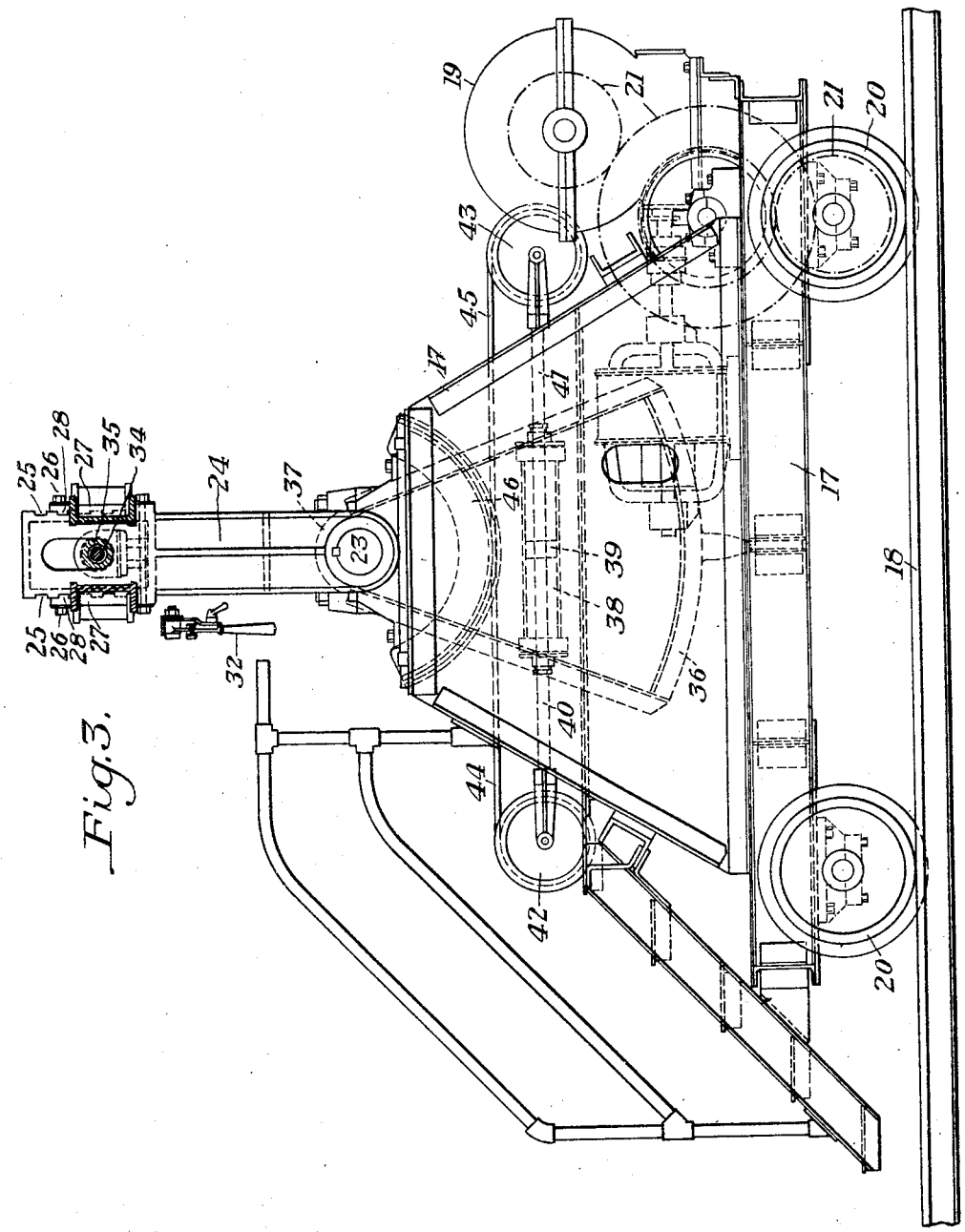

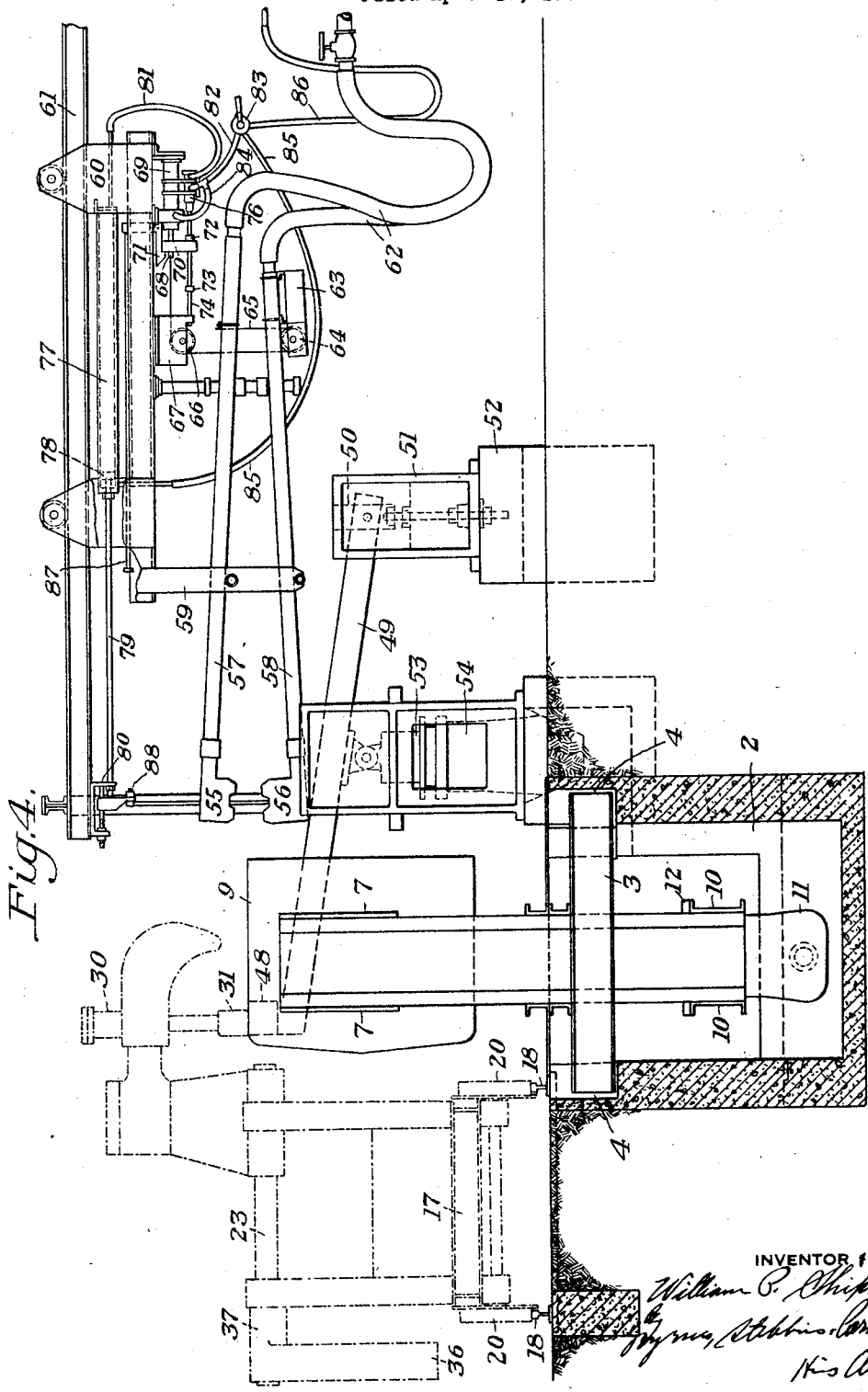

Nov. 13, 1928.
W. P. SHIPMAN
WELDING APPARATUS
Filed April 17, 1925    5 Sheets-Sheet 5
1,691,501
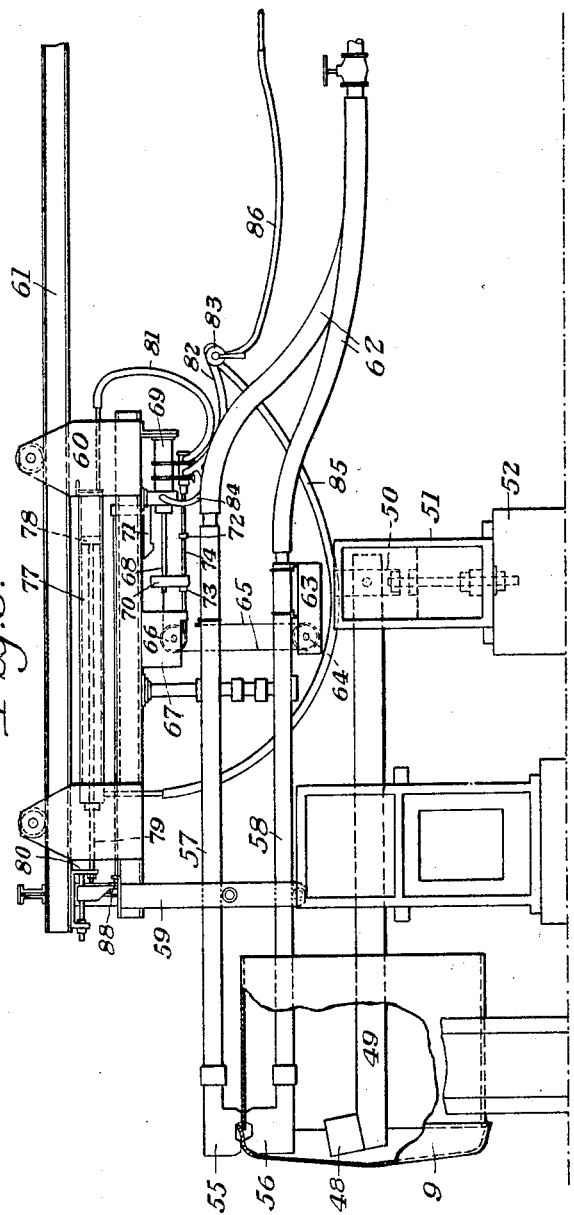
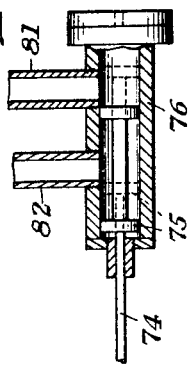
INVENTOR Patented Nov. 13, 1928.

1,691,501

UNITED STATES PATENT OFFICE.

WILLIAM P. SHIPMAN, OF PITTSBURGH, PENNSYLVANIA, ASSIGNOR TO BLAW-KNOX COMPANY, OF PITTSBURGH, PENNSYLVANIA, A CORPORATION OF NEW JERSEY.

WELDING APPARATUS.

Application filed April 17, 1925. Serial No. 23,837.

The present invention relates to welding apparatus and more particularly to apparatus for welding the corner portions of sheet metal boxes.

The invention is applicable to various forms of boxes, but is particularly useful for welding tops to the body portions of sheet metal annealing boxes, such as shown for example, in my Patent No. 1,449,200, of March 20, 1923. Such boxes are usually formed with rounded corners and the operation of making welds in these corners has been an exceedingly difficult one. By the present invention I provide an apparatus having a power hammer which is movable in the arc of a circle the center of which coincides with the center of curvature of the corner of the box to be welded and in combination therewith a pair of supports each of which is adapted to hold a box with its corners in operative relation to the hammer, the latter being mounted on a movable carriage adapted to move the hammer in operative relation to either support. My improved apparatus also includes suitable burners whereby the corner portion of a box supported in one of said supports can be brought to a welding temperature while the corner portion of another box held in the other support is being welded by the power hammer and a cooperating anvil.

A preferred embodiment of the invention is illustrated in the accompanying drawings, wherein—

Figure 1 is an end elevation of the apparatus, the pit in which the fluid pressure cylinders for operating the box supports being shown in section;

Figure 2 is a side elevation of the power hammer and the traveling carriage on which it is carried;

Figure 3 is a view showing the power hammer and its traveling carriage partly in end elevation and partly in section, the section being taken on the line III—III of Figure 2;

Figure 4 is a view showing the apparatus partly in side elevation and partly in section, the power hammer and traveling carriage being shown in dot and dash lines;

Figure 5 is a detail view showing the burners in operative relation to the corner portion of a supported box; and Figure 6 is a detail view of the valve mechanism for controlling the operation of the burners.

Referring to Figures 1 to 4 inclusive, 2 designates a pit. Extending transversely of the pit are pairs of channel beams 3 which are supported at their ends in recesses 4 in the side walls of the pit adjacent the top thereof. Longitudinally extending channel beams 5 are supported on these transverse beams. The longitudinal beams 5 support vertical members 6 which are built up of suitable plates and angles. The members 6 have attached to their upper ends plates 7 and 7$^a$ having edges 8 and 8$^a$ extending at right angles to each other and adapted to engage a side face and an end face of the body portion of an annealing box 9. Secured to the lower ends of the members 6 are longitudinally extending channel beams 10. Vertically extending hydraulic cylinders 11 are supported between the channel beams 10 by collars 12 on the cylinders which engage the upper surfaces of the channel beams. These hydraulic cylinders have plungers 13 working therein which have supports 14 at their upper ends for the annealing boxes 9. These supports have supporting surfaces 15 and 16 which extend at right angles to each other and parallel to the edges 8 and 8$^a$ of the plates 7 and 7$^a$. The surfaces 15 and 16 of each support are adapted to engage an end face and a side face of the body portion of an annealing box. The annealing boxes have lugs on their body portions whereby the boxes are adapted to be engaged by a crane and placed on the supports 14 when the plungers 13 of the hydraulic cylinders 11 are in the lowered position. When an annealing box is placed on a support 14, fluid is admitted to the cylinder 11 and the plunger raised. As the box is brought into engagement with the edges of the plates 7 and 7$^a$ the cylinder 11 is adapted to automatically adjust itself to the correct position by reason of the fact that it is slidably supported on the beams 10. Annealing boxes of varying size can therefore be properly supported by the supports 14 in cooperative relation to the plates 7 and 7$^a$.

A carriage 17 is arranged to travel in front of the supporting apparatus above described on tracks 18. The carriage is adapted to be moved along on the tracks by means of an electric motor 19 which is operatively connected with one of the track engaging wheels 20 of the carriage through a train of gears 21. Journaled in bearings 22 of the carriage is a transversely extending horizontal shaft 23. This shaft has the power hammer mechanism mounted thereon. This mechanism comprises an arm 24 which is keyed to the shaft 23 at its lower end and is bifurcated to straddle one of the bearings 22. The arm 24 has grooves 25 in its opposite faces adjacent its upper end. Secured to these opposite faces by screws 26 are a pair of spaced beams 27 which have ribs 28 engaging in the grooves 25. It will be apparent that this construction enables the beams 27 to be adjusted up or down by removing the screws 26 and inserting the ribs 28 in the proper grooves 25. Openings 29 are provided for receiving the screws in the different adjusted positions of the beams. The beams at their forward ends support the fluid pressure cylinder 30 which operates the power hammer 31. The valves for controlling the operations of the power hammer are controlled by a hand lever 32 connected with the valves by suitable links and levers. The fluid pressure cylinder 30 is slidably mounted between the beams 27 and is adapted to be moved back and forth by means of a handwheel 33 which operates a screw 34 engaging an internally threaded sleeve 35 attached to the cylinder. If desired, however, a fluid pressure cylinder may be substituted for the parts 33, 34 and 35. By this construction the power hammer is adapted to be moved back and forth as the blows are being delivered so as to distribute the blows over the different portions of the corner in the direction of the height of the box.

Attached to the rear end of the shaft 23 is a sector 36 which is built up of plates and angles and which constitutes a counterweight. This sector has a bearing portion 37 which is keyed to the shaft 23.

The power hammer is adapted to be oscillated by means of a fluid pressure cylinder 38. This cylinder has a piston 39 working therein and piston rods 40 and 41 which extend out through the opposite ends of the cylinder and carry sheaves 42 and 43 at their outer ends. Passing around these sheaves are cables 44 and 45. The cables are attached at one end to the carriage 17 and at their other end are engaged with segments 46 and 47 secured to the bearing portion 37. It will be apparent that when fluid is admitted to the cylinder on one side of the piston 39 the sheaves 42 and 43 will be moved in one direction, whereas when fluid is admitted to the cylinder on the other side of the piston the sheaves will be moved in the opposite direction. It will also be apparent that movement of the sheaves a given amount in one direction causes double that amount of movement of the ends of the cables which are attached to the segments 46 and 47. Suitable valve mechanism (not shown) is provided for controlling the operations of the fluid pressure cylinder 38 from a convenient point on the carriage. By means of this valve mechanism and the handwheel 33 the operator is enabled to cause the power hammer to move in the arc of a circle as it delivers its blows and also to advance back and forth in the direction of the height of the box. The blows can therefore be uniformly distributed over the corner of the box to be welded while the box is held stationary. The axis of the shaft 23 is approximately coincident with the center of curvature of the corner of the box supported on a support 14 against the edges 8 and 8ª of the plates 7 and 7ª, so that the hammer operates in the arc of a circle the center of which is coincident with the center of curvature of the corner of the box.

Arranged for cooperation with each of the box supports is an anvil 48. This anvil is carried on the outer end of a lever 49 which is pivotally connected at one end to a vertically adjustable pivotal support 50. This pivotal support is mounted in a housing 51 attached to a suitable base 52. The lever 49 has an hydraulic piston 53 pivotally connected thereto intermediate its ends, this piston working in a fluid pressure cylinder 54. By means of this mechanism the anvil can be raised into the operative position shown in Figure 4 or can be lowered into the inoperative position shown in Figure 5.

The apparatus includes suitable burners 55 and 56 for bringing the corner to be welded to a welding temperature. These burners are carried on the ends of pipes 57 and 58 which are pivotally mounted in a hanger 59 depending from a traveling carriage 60 which is adapted to be reciprocated back and forth on supporting beams 61. The pipes 57 and 58 have flexible hose 62 connected to their inner ends for supplying the combustion gases to the burner. Secured to the inner end of the pipe 58 is a weight 63 and carried by this weight is a pulley 64. A cable 65 is attached at one end to the inner end portion of the pipe 57 and passes around the pulley 64 and around a pulley 66 journaled in a bracket 67 carried by the carriage 60. The other end of this cable is attached to the end of a piston rod 68. The piston rod 68 is connected to a piston working in a fluid pressure cylinder 69. The piston rod 68 carries a detent 70 which is adapted to be engaged by a latch 71 for holding the piston rod 68 retracted and the burners in the open position shown in Figure 4. The detent 70 is engageable with collars 72 and 73 on a piston rod 74. The piston rod 74 is attached to a valve 75 working in a valve cylinder 76 (Figure 6). The carriage 60 carries a fluid pressure cylinder 77 in which works a piston 78 carried on the inner end of a piston rod 79. The piston rod 79 is attached at its other end to a bracket 80. A pipe 81 establishes communication between one end of the cylinder 77 and one end of the valve cylinder 76. Another pipe 82 establishes communication between the other end of the valve cylinder and a four-way valve 83. A branch pipe 84 connects the pipe 82 with one end of the cylinder 69. The other end of the cylinder 77 is connected with the four-way valve by a pipe 85 and a supply pipe 86 is connected to the four-way valve.

With the parts in the position shown in Figure 4, if the four-way valve 83 is turned to admit air to the pipe 85 the carriage 60 is moved forwardly to carry the burners into operative relation to the corner to be welded. At this time the valve 75 is in its inner position shown in dotted lines in Figure 6 so that communication is established between one end of the cylinder 77 and the exhaust port of the four-way valve through the pipes 81 and 82. When the carriage 60 reaches its innermost position the end of a latch operating rod 87 engages a stop 88 whereby the latch 71 is operated to release the detent 70. When this occurs the weight 63 moves the burner 56 into engagement with the inner surface of the corner to be welded and the weight of the burner 55 moves said burner into engagement with the outer surface of said corner. This movement of the burners causes the piston rod 68 to be moved outwardly. It will be noted that at this time one end of the cylinder 69 is connected with the exhaust port of the four-way valve through the pipes 82 and 84 so that the air is permitted to exhaust freely from said cylinder. When it is desired to withdraw the burners the four-way valve is turned to establish communication between the supply pipe 86 and the cylinder 69 through the pipes 82 and 84. This causes the piston rod 68 to be retracted thereby pulling on the cable 65 and moving the burners to the open position shown in Figure 4. As the detent 70 moves rearwardly it engages the collar 72 on the piston rod 74 and moves the valve 75 to open position, the valve having been moved to closed position by reason of the engagement of the detent 70 with the collar 73 when the burners moved to closed position. As soon as the valve 75 reaches its inward position communication is established between the supply pipe 86 and one end of the cylinder 77 through the pipes 81 and 82 so that the carriage 60 immediately begins to move rearwardly. The initial rearward movement of the carriage causes the latch 71 to drop into engagement with the detent 70 whereby the burners are held in the open position. During the rearward movement of the carriage 60 the opposite end of the cylinder 77 is in communication with the exhaust port of the four-way valve through the pipe 85.

A separate burner mechanism may be arranged for cooperation with each of the annealing box supports or a single burner mechanism may be provided and supported on an overhead crane whereby the burner mechanism may be shifted from one support to the other.

It will be apparent that with this construction the carriage 17 can be moved into position for welding the corner of a box supported on one of the supports 14 while the burners are bringing the corner of a box supported on the other support to a welding temperature. After the corner of one box has been welded the carriage can be moved back to a position to weld the corner of the box on the other support which has just been brought to a welding temperature. Then the box which has had one corner welded may be lifted off of its support by means of a crane and turned and replaced on the support so as to bring the diagonally opposite corner of the box into position to be welded. It will be apparent that two diagonally opposite corners of the box can be welded while the box is on one support and then the box can be transferred to the other support and the two other diagonally opposite corners of the box welded.

By providing a power hammer which is adapted to move in the arc of a circle it is unnecessary to provide means for rotating the annealing box during the welding operation. While this mechanism is particularly adapted for welding the corners of annealing boxes it is also adapted for welding circular objects such as steam boilers. Heretofore in welding circular objects of this character it has only been possible to weld a relatively small arc of the circumference of the circular object at one time. By having a hammer adapted to oscillate in the arc of a circle it is possible to weld a much greater arc of the circumference of the circular object before it is necessary to rotate the circular object into another angular position.

While I have illustrated and described a preferred embodiment of my invention it will be understood that the invention is not limited to the disclosed embodiment thereof but that it may be otherwise embodied within the scope of the appended claims without departing from the spirit of the invention.

I claim:

1. Welding apparatus, comprising a frame, a shaft rotatably mounted therein, a hammer connected to said shaft for rotation therewith and mounted laterally of said shaft for effective impact movement radially toward the axis of said shaft, and means for operating said hammer.

2. Welding apparatus, comprising a frame, a shaft rotatably mounted therein, a cylinder connected to said shaft for rotation therewith and mounted laterally of said shaft with its extended axis intersecting the extended axis of said shaft, a hammer mounted for effective movement axially of said cylinder toward said shaft, and means for operating said hammer.

3. In a machine for welding curved corners of an annealing box, a hammer pivoted to swing about a center, and guide means to retain the box with a curved corner thereof so related to the hammer that the center of said curved corner substantially coincides with the supporting axis of the hammer.

4. In a machine for welding curved corners of an annealing box, a hammer pivotally supported about an axis, and supporting means for an annealing box for holding such box with a curved corner so related to the hammer that the center of said curved corner substantially coincides with the axis about which the hammer is supported.

In testimony whereof I have hereunto set my hand.

WILLIAM P. SHIPMAN.